(12) United States Patent
Meister et al.

(10) Patent No.: US 7,837,155 B2
(45) Date of Patent: Nov. 23, 2010

(54) BOUNDARY LAYER SUCTION ARRANGEMENT

(75) Inventors: Juergen Meister, Neuenkirchen (DE); Juergen Pfennig, Maerkische Heide (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/568,880

(22) PCT Filed: May 11, 2005

(86) PCT No.: PCT/EP2005/005098

§ 371 (c)(1),
(2), (4) Date: May 16, 2007

(87) PCT Pub. No.: WO2005/113335

PCT Pub. Date: Dec. 1, 2005

(65) Prior Publication Data

US 2007/0266707 A1 Nov. 22, 2007

Related U.S. Application Data

(60) Provisional application No. 60/606,649, filed on Sep. 2, 2004.

(30) Foreign Application Priority Data

May 13, 2004 (DE) .................. 10 2004 024 016

(51) Int. Cl.
*B64C 21/06* (2006.01)
(52) U.S. Cl. .................................. 244/209
(58) Field of Classification Search ............... 244/208, 244/209; 60/785
See application file for complete search history.

(56) References Cited

U.S. PATENT DOCUMENTS

| 2,833,492 | A | 5/1958 | Fowler |
| 3,887,147 | A | 6/1975 | Grieb |
| 4,642,997 | A | 2/1987 | Krafka |
| 5,114,103 | A | 5/1992 | Coffinberry |

(Continued)

FOREIGN PATENT DOCUMENTS

DE 4128078 A1 3/1992

(Continued)

OTHER PUBLICATIONS

J.W. Connors, et al., Propulsion Systems for Laminar Flow Aircraft, XP008050510, Aerospace Engineering Aug. 1961, pp. 16, 17, 70-79.

(Continued)

*Primary Examiner*—Timothy D Collins
*Assistant Examiner*—Valentina Xavier
(74) *Attorney, Agent, or Firm*—Christopher Paradies; Fowler White Boggs P.A.

(57) ABSTRACT

A suction arrangement for drawing off a boundary layer on an aircraft comprises a suction arrangement including an outer skin having suction surfaces in critical flow areas, and at least one air breathing engine providing suction. Bleed air is drawn from a comparatively high-pressure region of the engine by means of a branch line and the bleed air is used for driving a turbine of at least one turbo-supercharger assembly. A compressor of the turbo-supercharger assembly or assemblies serves as the suction source for drawing off a boundary layer at the suction surfaces in critical flow areas.

3 Claims, 1 Drawing Sheet

U.S. PATENT DOCUMENTS 5,884,873 A 3/1999 Breit
6,189,324 B1 2/2001 Williams et al.
6,216,982 B1 * 4/2001 Pfennig et al. .............. 244/130

FOREIGN PATENT DOCUMENTS

| | | |
|---|---|---|
| DE | 19643069 C2 | 3/1999 |
| DE | 19820097 A1 | 11/1999 |
| DE | 19820097 C2 | 2/2003 |
| EP | 0517459 A1 | 12/1992 |
| EP | 517459 A1 * | 12/1992 |
| EP | 0778199 A2 | 6/1997 |
| RU | 2028963 C1 | 2/1995 |
| RU | 2084377 C1 | 7/1997 |
| WO | 95/19290 A1 | 7/1995 |

OTHER PUBLICATIONS

R.E. Kosin, Laminar Flow Control by Suction as Applied to the X-21A Airplane, XP008050509, J. Aircraft, Sep.-Oct. 1965, pp. 384-390.

L.A. Marshall, Summary of Transition Results From the F-16XL-2 Supersonic Laminar Flow Control Experiment, XP-002338570, American Institute of Aeronautics and Astronautics, pp. 1-13.

G.V. Lachmann, Aspects of Design, Engineering and Operational Economy of Low Draft Aircraft, Boundary Layer and Flow Control—Its Principles and Application, vol. 2, Pergamon Press, 1961, pp. 1123-1165.

R. Henke, The Arbus A320 HLF FIN Programme, Novele revue d-Aeronaitique et d'Astronautique, vol. 209, pp. 53-55.

J.B. Edwards, Fundamental Aspects of Propulsion for Laminar Flow Aircraft, Boundary Layer and Flow Control—Its Principles and Application, vol. 2, Pergamon Press, 1961, pp. 1077-1122.

W. Pfenninger, Some results from the X21 Programme. Part 1: Flow Phenomena at the Leading Edge of Swept Wings, Recent Developments of Boundary Layer Research, PIV, Agardograph 97, May 1965.

* cited by examiner

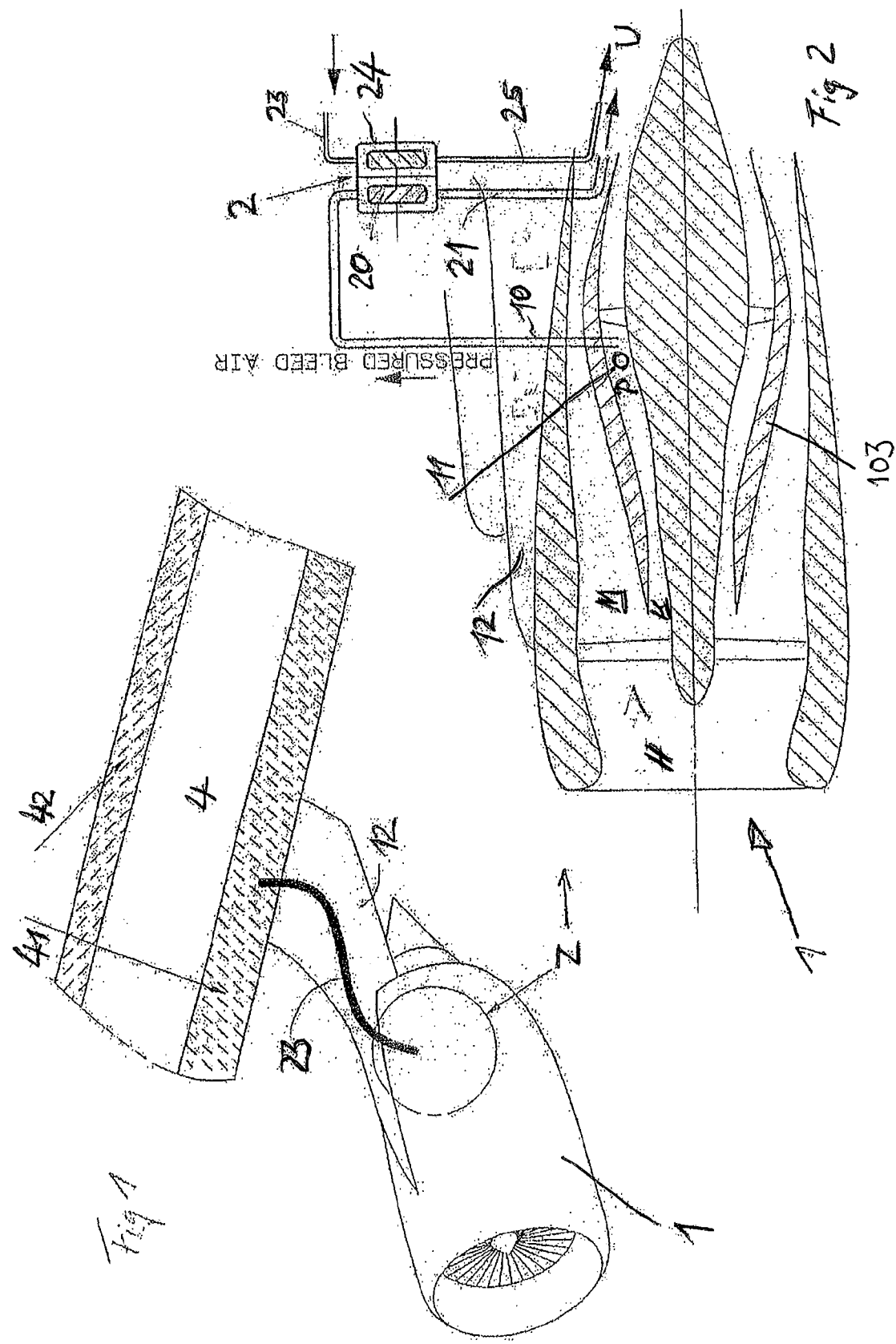

BOUNDARY LAYER SUCTION ARRANGEMENT

FIELD OF THE INVENTION

The field pertains to a suction arrangement for drawing off boundary layers on an aircraft with a structure, the outer skin of which contains suction surfaces in critical flow areas, and with at least one air breathing engine, from which the suction power required for drawing off the boundary layer is obtained.

BACKGROUND OF THE INVENTION

A suction arrangement of the above-described type is known from DE 198 20 097 C2. In this known arrangement, the suction power for drawing off the boundary layer is generated by a jet pump arranged in the main flow of the engine. This suction arrangement provides the advantages that no moving parts are required in order to generate the suction power for drawing off the boundary layer, and that the arrangement consequently is highly unsusceptible to defects. However, one significant disadvantage of this known suction arrangement can be seen in the fact that a substantial power loss occurs due to the placement of the jet pump in the main flow of the engine. This power loss also cannot be completely prevented when the suction arrangement is not needed.

SUMMARY OF THE INVENTION

It is one object to develop a suction arrangement for drawing off boundary layers that makes it possible to achieve a highly efficient power conversion and to prevent power losses in operating states, in which the suction arrangement is not needed. In a suction arrangement for drawing off boundary layers this object is attained by suctioning bleed air from the high-pressure region of an engine using a branch line used for driving a turbine of a turbo-supercharger assembly. The compressor (also referred to as turbo pump) has a branch line that serves as the suction source for drawing off the boundary layer.

A turbo-supercharger assembly ensures a highly efficient power conversion, and the connection of a branch line for withdrawing the bleed air from the engine may be realized in such a way that no power loss occurs in the engine when the branch line is shut off, also improving efficiency.

In a bypass engine having a bypass structure 103, as illustrated in FIG. 2 with a core flow and a bypass flow, it is advantageous to withdraw the bleed air in the region of the high-pressure compressor because this makes it possible to obtain the maximum power possible for the turbo-supercharger assembly.

In one example, the pressure line of the compressor (turbo pump) of the turbo-supercharger assembly opens into the main flow of the engine at a point of low pressure. This location contributes to maintaining a low pressure differential between the suction channel system of the arrangement for drawing off boundary layers and the outlet of the pressure line, i.e., the pressure differential to be overcome by the compressor of the supercharger assembly, such that the power generated by the compressor may be optimally utilized.

In another example, several low-power supercharger assemblies are used instead of one heavy-duty turbo-supercharger assembly, wherein these supercharger assemblies are accommodated in the region of the engine suspension and/or the engine fairing. The advantage of these variations include comparatively low flow and heat losses due to shorter pressure and suction lines that may be used for connecting the turbine of the turbo-supercharger assembly to the engine.

It is also advantageous to realize the turbo-supercharger assembly in the form of a single-shaft machine having a plurality of turbo-supercharger assemblies using a common shaft, because machines of this type are available in the form of components with a simple design that can be inexpensively manufactured.

BRIEF DESCRIPTION OF THE FIGURES

Examples are described below with reference to the enclosed figures.

FIG. 1 illustrates an aircraft wing with suction surfaces for drawing off the boundary layer, as well as the aircraft engine arranged underneath said wing, FIG. 2 illustrates a schematic cross section through the aircraft engine according to FIG. 1 with a suction arrangement according to the invention for drawing off boundary layers.

DETAILED DESCRIPTION

The examples described and drawings rendered are illustrative and are not to be read as limiting the scope of the invention as it is defined by the appended claims.

FIG. 1 shows an example of an aircraft structure, the outer skin of which contains suction surfaces in critical flow areas, namely an aircraft wing 4 that is provided with suction surfaces 41, 42. An engine 1 is mounted on the aircraft wing 4 by means of a suitable engine suspension 12. A suction line 23 for drawing off a boundary layer through the suction surfaces 41, 42 leads from the wing 4 to a region of the engine 1 that is identified by the reference symbol Z. A suction arrangement for drawing off boundary layers is provided in this region Z. It should be noted that the aforementioned suction surfaces may also be provided for drawing of boundary layers on the engine fairing.

FIG. 2 shows a schematic section through the region Z of the aircraft engine. The aircraft engine is identified as a whole by the reference symbol 1. This engine consists of a so-called bypass engine with a main flow H that is divided into a core flow K and a bypass flow M downstream of a so-called front fan. The core flow K flows to the engine outlet via the high-pressure compressor 11 and a high-pressure turbine. A high-pressure region in the vicinity of the high-pressure compressor 11 is identified by the reference symbol P. A branch line 10 for withdrawing high-pressure bleed air is connected to the engine 1 in this region. The branch line 10 leads to a turbo-supercharger assembly 2. The turbo-supercharger assembly is realized in the form of a single-shaft machine with a turbine 20 and a compressor (turbo pump) 24. The bleed air withdrawn from the high-pressure compressor 11 drives the turbine 20 and is then returned into the main flow H of the engine 1 via an exhaust line 21. The compressor 24 of the turbo-supercharger assembly 2 that is driven by the turbine 20 conveys the air from the suction line 23 into the main flow H of the engine 1 via a pressure line 25, wherein the pressure line 25 opens into the main flow H of the engine at a point of low static pressure U.

In an alternative example, instead of utilizing one heavy-duty turbo-supercharger assembly 2, several smaller turbo-supercharger assemblies are used. Such smaller supercharger assemblies are identified by the reference symbols 2a and 2b and drawn with broken lines in FIG. 2, for example. An advantage of utilizing smaller turbo-supercharger assemblies is that such assemblies are more readily accommodated in the engine suspension 12 or the engine fairing as shown in FIG. 2.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Alternative combinations and variations of the examples provided will become apparent based on the disclosure. It is not possible to provide specific examples for all of the many possible combinations and variations of the embodiments described, but such combinations and variations may be claims that eventually issue.

LIST OF REFERENCE SYMBOLS

1 Aircraft engine
2 Turbo-supercharger assembly
2a Low-power turbo-supercharger assemblies
2b Low-power turbo-supercharger assemblies
4 Wing
41 Suction surface of 4
42 Suction surface of 4
10 Branch line
11 High-pressure compressor
12 Engine suspension
20 Turbine
21 Exhaust line
23 Suction line
24 Compressor (turbo pump)
25 Pressure line of 24
H Main flow
K Core flow
M Bypass flow
P High-pressure region
U Low-pressure region
Z Region of 1 with the suction arrangement for drawing off boundary layers

The invention claimed is:

1. A suction arrangement for drawing off a boundary layer on an aircraft with a structure, comprising:
an outer skin including suction surfaces in critical flow areas;
an air breathing bypass engine, the bypass engine comprising a nacelle, a front fan, a bypass structure, a bleed air branch line, and an engine outlet downstream from the front fan, a bypass structure dividing a main flow entering the nacelle and exiting the engine outlet into a core flow and a bypass flow, wherein the core flow of the bypass engine flows to the engine outlet via a high-pressure compressor region and a high-pressure turbine region, wherein an inlet of the bleed air branch line withdraws bleed air from a the high-pressure compressor region of the bypass engine and the bleed air from the bleed air branch line drives a turbine of a turbo-supercharger assembly, the turbo-supercharger assembly having a compressor serving as a suction source fluidically coupled to the suction surfaces of the outer skin for drawing off the boundary layer, wherein a pressure line from the compressor of the turbo-supercharger assembly fluidically couples the compressor of the turbo-supercharger assembly to the main flow exiting the engine outlet of the bypass engine at a location of lower static pressure than the high-pressure region of the bypass engine, and wherein an exhaust line fluidically couples an exhaust flow of the turbine of the turbo-supercharger assembly to the main flow exiting the engine outlet of the bypass engine.

2. The suction arrangement of claim 1, wherein at least one additional turbo-supercharger assembly is utilized and each of the turbo-supercharger assemblies are accommodated in a region of an engine suspension structure, an engine fairing, or both.

3. The suction arrangement of claim 2, wherein each of the turbo-supercharger assemblies use a common shaft.

* * * * *